N. Y. ROBERTSON AND H. MOSS.
PIPE AND HOSE COUPLING.
APPLICATION FILED SEPT. 25, 1918.
1,333,342. Patented Mar. 9, 1920.
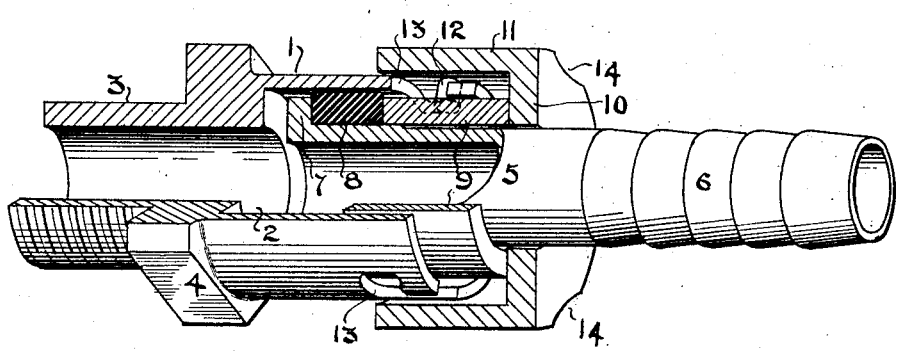
Inventors,
Noël Yeo Robertson,
Herbert Moss.
By Glenn S. Noble
Att'y.

UNITED STATES PATENT OFFICE.

NOEL YEO ROBERTSON AND HERBERT MOSS, OF JOHANNESBURG, TRANSVAAL, SOUTH AFRICA.

PIPE AND HOSE COUPLING.

1,333,342.

Specification of Letters Patent.

Patented Mar. 9, 1920.

Application filed September 25, 1918. Serial No. 255,612.

*To all whom it may concern:*

Be it known that we, NOEL YEO ROBERTSON and HERBERT MOSS, British subjects, and residents of 11–17 Trust Buildings, Fox street, Johannesburg, Transvaal, South Africa, have invented certain new and useful Improvements in Pipe and Hose Couplings, of which the following is a specification.

The present invention relates to couplings for pipes and the like of the kind in which the jointing effect is brought about by the pressure of fluid within the coupling. The object of the invention is to produce a novel coupling of this kind the connection and disconnection of which can be effected rapidly and without the exercise of force.

The accompanying drawing is a projected view partly in section of a coupling constructed according to this invention.

1 indicates a socket element formed with a socket 2. In the present instance this element is formed with a threaded end 3 for screwing it to a fixture, and with a hexagon 4 for the application of a spanner.

5 is a spigot element adapted to enter the socket 2. This element may be constructed at the end 6 for connection to a hose.

At the forward end of the spigot element 5 is formed a flange 7 which approximately fits the socket 2. Behind said flange is a resilient washer 8 of such external diameter that when uncompressed it fits easily in the socket.

9 is a sleeve which is slipped over the spigot 5. It engages the back of the washer 8 and is suitably secured to the socket element 1 to form an abutment for the washer to bear against. For this purpose in the construction shown, it is engaged by the internal flange 10 of a coupling sleeve 11. The latter is arranged to engage the socket element 1 by quick acting coupling means, such as internal pins 12 on the coupling sleeve which engage bayonet slots 13 formed in the socket element. The sleeves 9 and 11 may if desired be made integral. The coupling sleeve is serrated on the outside as indicated at 14, to enable it to be readily turned by hand when engaging the pins in the bayonet slots.

In use, the spigot 5 is slipped into the socket 2, and the sleeve 9 being in place, the coupling sleeve 11 is coupled to the socket element 1. As all parts are perfectly free, these movements are made without difficulty. The flange 7 need not touch the bottom of the socket and the spigot is free to move endwise in relation to the socket and the coupling sleeve.

Upon fluid under pressure being admitted to the coupling, the unbalanced pressure on the end of the spigot forces the same back against the sleeve 9, which is held by the coupling sleeve 11. This pressure is transmitted through the washer 8, which is thereby compressed longitudinally and caused to expand into contact with the internal surface of the socket, so making a tight joint therewith. Upon the fluid pressure being removed, all parts become free again and may be disconnected with ease.

We claim,

1. In a pipe or like coupling, the combination with a socket element providing a socket, a spigot element adapted to pass into the socket, and having an enlargement at its front end, a resilient washer positioned on the spigot behind the enlargement and freely movable in the socket, and means to retain the spigot in the socket, said means engaging the back of the washer, whereby upon pressure being established within the coupling the washer is compressed into contact with the socket.

2. In a pipe or like coupling, the combination with a socket element providing a socket, a spigot element adapted to pass into the socket, and having an enlargement at its front end, a resilient washer positioned on the spigot behind the enlargement and freely movable in the socket, and means connectible to the socket element by a quick acting coupling and engaging the back of the washer.

3. In a pipe or like coupling, the combination with a socket element providing a socket, a spigot element adapted to pass into the socket, and having an enlargement at its front end, a resilient washer positioned on the spigot behind the enlargement and freely movable in the socket, a coupling sleeve connectible to the socket element and a sleeve surrounding the spigot and held by said coupling sleeve against the back of the washer.

4. A pipe or like coupling comprising elements mutually separable by pressure within the coupling, a device to limit separating movement of said parts and a resilient member adapted to be compressed by separating movement of said elements and thereby form a fluid tight joint between them.

In testimony whereof we affix our signatures.

NOEL YEO ROBERTSON.
HERBERT MOSS.